United States Patent [19]

Dshkhunian et al.

[11] Patent Number: 4,467,413
[45] Date of Patent: Aug. 21, 1984

[54] MICROPROCESSOR APPARATUS FOR DATA EXCHANGE

[76] Inventors: Valery L. Dshkhunian, 103482, korpus 338-a, kv. 73; Sergei S. Kovalenko, 103498, korpus 421, kv. 3; Pavel R. Mashevich, 103482, korpus 338-a, kv. 139; Vyacheslav V. Telenkov, 103527, korpus 811, kv. 75; Jury E. Chicherin, 103460, korpus 161, kv. 31, all of Moscow, U.S.S.R.

[21] Appl. No.: 270,526

[22] PCT Filed: Nov. 28, 1979

[86] PCT No.: PCT/SU79/00117
§ 371 Date: Jun. 8, 1981
§ 102(e) Date: Jun. 8, 1981

[87] PCT Pub. No.: WO81/01622
PCT Pub. Date: Jun. 11, 1981

[51] Int. Cl.³ .............................................. G06F 9/18
[52] U.S. Cl. .................................................. 364/200
[58] Field of Search ... 364/200 MS File, 900 MS File

[56] References Cited

U.S. PATENT DOCUMENTS 4,020,472  4/1977  Bennett et al. ...................... 364/200
4,086,627  4/1978  Bennett et al. ...................... 364/200

Primary Examiner—Gareth D. Shaw
Assistant Examiner—Tim A. Wiens
Attorney, Agent, or Firm—Steinberg & Raskin

[57] ABSTRACT

Microprocessor apparatus for data exchange is controlled by information supplied via a microinstruction bus and a triggering line and transmits data from some external bidirectional data buses to other such buses. Data is supplied via data exchange units ($1_1$, $1_2$, 2), internal bidirectional data buses and a switch. In addition to the transmission of information, the microprocessor apparatus can, depending on the code of the microinstruction, count the number of transmitted words via a counter and compare or mask data or arbitrate transmitted data via a data processing/converting unit. While executing microinstructions, the counter, the data processing unit, a register unit and a switch shape distinguishing features of the processed information, to be later fed to a conditional operation unit. The conditional operation unit shapes a generalized condition for readjustment of operation of a control unit.

5 Claims, 5 Drawing Figures

4,467,413

MICROPROCESSOR APPARATUS FOR DATA EXCHANGE

BACKGROUND OF THE INVENTION

The present invention relates to digital data processing. More particularly, the invention relates to microprocessor data exchange apparatus.

U.S. Pat. No. 4,020,472, issued Apr. 26, 1977, discloses a microprocessor data exchange apparatus which comprises a plurality of data exchange units having first multichannel inputs/outputs combined with external bidirectional data buses, a register unit having bidirectional inputs/outputs connected to internal bidirectional data buses attached to second multichannel inputs/outputs of data exchange units belonging to another plurality.

The known apparatus also comprises a control unit having multichannel outputs coupled to control inputs of the data exchange units and the register unit, having a multichannel input connected to a microinstruction bus, an input coupled to a triggering line, and an input/output connected to a clock line.

The known apparatus provides a slow transfer of both a data set of a given length and a single information byte, and cannot handle or analyze data during exchange.

SUMMARY OF THE INVENTION

The principal object of the invention is to provide microprocessor data exchange apparatus having a considerable speed increase in transferring both a data set of a given length and a single information byte and also processing and analysis of data in the course of exchange due to the availability of new units and links.

This object is attained by the microprocessor data exchange apparatus of the invention, comprising two pluralities of data exchange units having first multichannel inputs/outputs coupled to external bidirectional data buses. A register unit has bidirectional inputs/outputs coupled to internal bidirectional data buses which connect second multichannel inputs/outputs of the data exchange units of a first of the two pluralities. A control unit has a multichannel output connected to control inputs of the data exchange units of the two pluralities and the register unit, a multichannel input coupled to a microinstruction bus, a first input coupled to a triggering line, and also an input/output connected to a clock bus. In accordance with the invention, a data processing unit is provided for converting information in the course of exchange a counter has inputs/outputs coupled, together with a multichannel input group of the data processing/converting unit, to the internal bidirectional data buses. A multichannel output of the counter is applied to a multichannel input of the data processing/converting unit.

The apparatus also includes a switch adapted to change the direction of data flow. The switch has a first group of multichannel inputs/outputs coupled to the internal bidirectional buses, and a second group of multichannel inputs/outputs coupled to a second multichannel inputs/outputs of the data exchange units of a second of the two pluralities. The first multichannel inputs of the switch are coupled to multichannel outputs of the data processing unit.

Besides, there is also provided a conditional operation unit for generating processed information tags having an input/output coupled to an external line, multichannel inputs/output coupled to the internal bidirectional data buses, a multichannel input connected to the microinstruction bus, four inputs coupled respectively to the outputs of the register unit, the counter, the data processing/converting unit and the switch, and an output coupled to a second input of the control unit. Multichannel inputs/outputs of the control unit are coupled to the internal bidirectional data buses and its multichannel output is coupled to respective control inputs of the counter, the data processing/converting unit, the switch, and the conditional operation unit.

The register unit preferably comprises a storage register and a shift register, multichannel inputs/outputs of these registers being coupled to the internal bidirectional information buses. An output of the most significant bit of the shift register is connected to a respective input of the conditional operation unit.

The data processing/converting unit preferably comprises a comparator, a masking circuit and a priority circuit having their multichannel outputs combined and applied to the multichannel input of the switch. The multichannel input group of the comparator and the masking circuit is connected to the internal bidirectional data buses and their multichannel outputs are combined and connected to a multichannel input of the priority circuit. The multichannel input of the comparator is connected to the multichannel output of the counter, and outputs of the masking circuit and the comparator are combined and applied to the input of the conditional operation unit.

The conditional operation unit preferably includes a condition code generator having an output connected to the second input of the control unit, a processed information tag masking circuit having an output applied to an input of the condition code generator and coupled to the external line, a processed information status register having four inputs connected to the outputs of the register unit, the counter, the data processing/converting unit and the switch, respectively, and a multichannel output coupled to a first multichannel input of the processed information tag masking circuit, a condition code polarity register and a processed information tag mask register having their multichannel inputs/outputs connected to the internal bidirectional information buses and having their multichannel inputs connected to the microinstruction bus. A multichannel output of the processed information tag mask register is applied to a second multichannel input of the processed information tag masking circuit, and an output of the condition code polarity register is applied to an input of the condition code generator.

The control unit preferably comprises an operating mode register for the microprocessor apparatus having multichannel inputs/outputs coupled to the internal bidirectional information buses, a microinstruction register having a multichannel input connected to the microinstruction bus and a microoperation decoder having a multichannel input coupled to a multichannel input of the operating mode register and to a multichannel output of the microinstruction register. A multichannel output of the microoperation decoder is coupled to respective control inputs of an internal operating cycle generator having two inputs connected respectively to the triggering line and to the output of the conditional operation unit. The internal operating cycle generator has an input/output coupled to the clock bus, and a multichannel input coupled to a multichannel output of the operating mode register.

The inclusion of the switch, the data processing/converting unit and the counter in the microprocessor apparatus of the invention permits increasing the speed of the system, since the processing and analysis of information can be effected during exchange. The inclusion of the conditional operation unit having the condition code generator and the processed information tag masking circuit provides for system flexibility when generating a condition code and a capacity of the microprocessor information exchange unit to respond to different condition codes appearing during data processing. This also permits expanding the wordlength of the data exchange units by combining several microprocessor data exchange apparatuses.

The availability of the microprocessor apparatus operating mode register and the link of the control unit with the conditional operation unit makes it possible to extend both the number of executable microinstructions and to modify microinstructions depending on the condition code as well as to execute repeatable microinstructions.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 1:
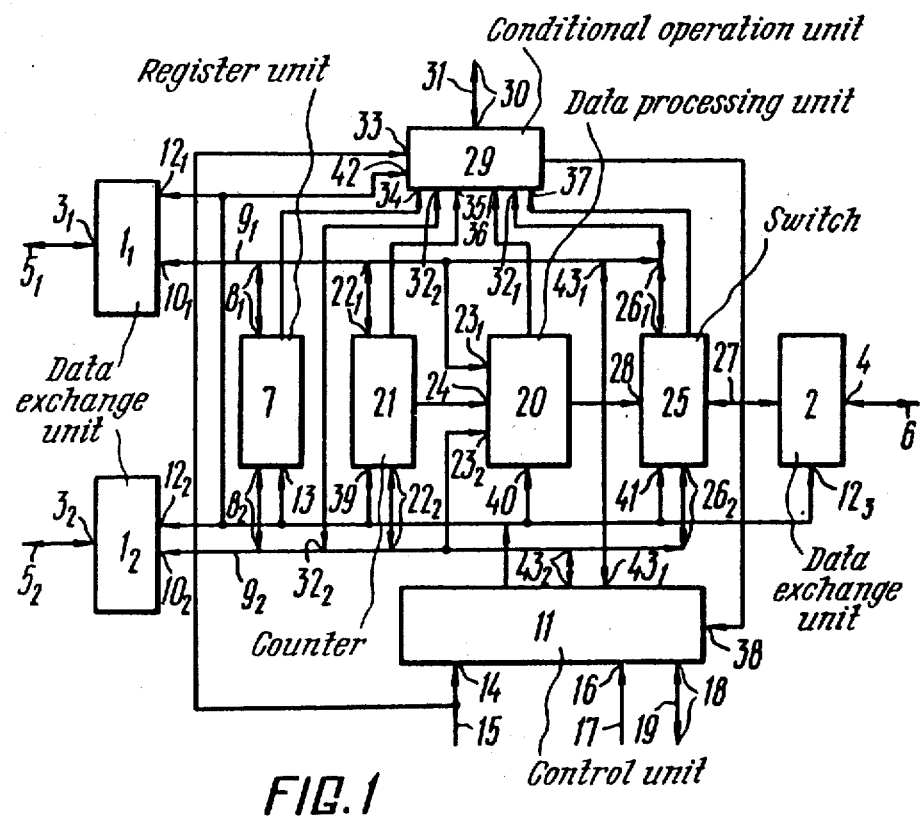
FIG. 1 is a block diagram of an embodiment of the microprocessor apparatus for data exchange, according to the invention.

In accordance with the invention, the microprocessor apparatus for data exchange comprises two pluralities of data exchange units $1_1$, $1_2$ and 2 (FIG. 1) whose multichannel inputs/outputs are combined with external bidirectional data buses $5_1$, $5_2$, 6. A register unit 7 has bidirectional inputs/outputs $8_1$, $8_2$ linked to internal bidirectional data buses $9_1$, $9_2$ joined with second multichannel data inputs/outputs $10_1$, $10_2$ of the information exchange units $1_1$, $1_2$ of one plurality.

The microprocessor apparatus further comprises a control unit 11 whose multichannel output is connected to control inputs $12_1$, $12_2$, $12_3$, 13 of the data exchange units and the register unit 7, respectively. The control unit 11 has a multichannel input 14 to a microinstruction bus 15, a first input 16 coupled to a triggering line 17, and an input/output 18 coupled to a clock bus 19.

A data processing/connecting unit 20 is provided for converting information in the course of exchange. A counter 21 having inputs/outputs $22_1$, $22_2$ is coupled, together with a multichannel input group $23_1$, $23_2$ of the data processing/converting unit 20, to the internal bidirectional information buses $9_1$, $9_2$, respectively. A multichannel output of the counter 21 is applied to a multichannel input 24 of the data processing/converting unit 20.

A switch 25 is provided to change the direction of data flow. The switch 25 has a first group of multichannel inputs/outputs $26_1$, $26_2$ coupled to the internal bidirectional data buses $9_1$, $9_2$ and a second group of multichannel inputs/outputs 27 coupled to second multichannel inputs/outputs of the information exchange units 2 of another plurality.

A multichannel input 28 of the switch 25 is coupled to a multichannel output of the data processing/converting unit 20.

A conditional operation unit 29 is provided for generating the processed information tags. The conditional operation unit 29 has an input/output 30 coupled to an external line 31, multichannel inputs/outputs $32_1$, $32_2$ coupled to the internal bidirectional information buses $9_1$, $9_2$, a multichannel input 33 connected to the microinstruction bus 15 and inputs 34, 35, 36, 37 applied respectively to the outputs of the register unit 7, the counter 21, the data processing/converting unit 20 and the switch 25.

An output of the conditional operation unit 29 is coupled to a second input 38 of the control unit 11. The control unit 11 has a multichannel output connected to control inputs 39, 40, 41, 42 of the units 21, 20, 25, 29, respectively.

Multichannel inputs/outputs $43_1$, $43_2$ of the control unit 11 are coupled to the internal bidirectional information buses $9_1$, $9_2$.

Figure 2:
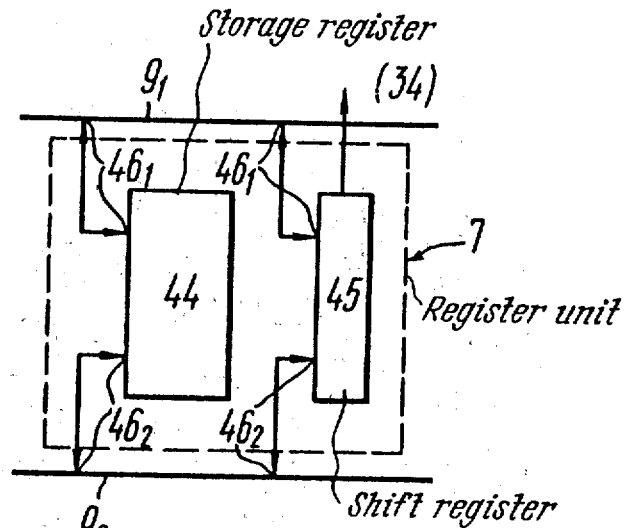
FIG. 2 is a block diagram of an embodiment of the register unit of the invention.

The register unit 7 comprises a storage register 44 and a shift register 45, as shown in FIG. 2. Multichannel inputs/outputs $46_1$, $46_2$ of these registers are coupled to the internal bidirectional data buses $9_1$, $9_2$. An output of the most significant bit of the shift register 45 is connected to the input 34 of the conditional operation unit 29.

Figure 3:
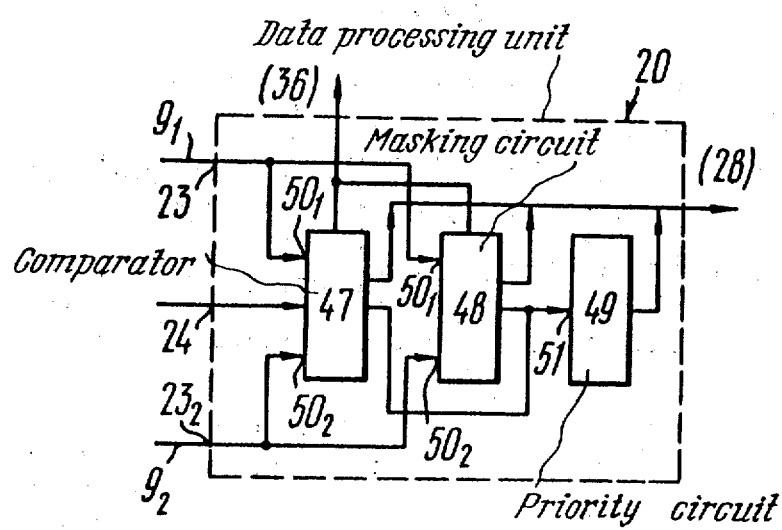
FIG. 3 is a block diagram of an embodiment of the data processing unit, of the invention.

The data processing/converting unit 20 (FIG. 3) comprises a comparator 47, a masking circuit 48 and a priority circuit 49. The combined multichannel outputs of the components 47, 48 and 49 are connected to the multichannel input 28 of the switch 25 (FIG. 1).

A multichannel input group $50_1$, $50_2$ (FIG. 3) of the comparator 47 and the masking circuit 48 is connected to the internal bidirectional data buses $9_1$, $9_2$. The multichannel outputs of the components 47 and 48 are combined and connected to a multichannel input 51 of the priority circuit 49.

A multichannel input of the comparator 47 is connected to the multichannel output of the counter 21 (FIG. 1). Outputs of the masking circuit 48 (FIG. 3) and the comparator 47 are combined and applied to the input 36 of the conditional operation unit 29 (FIG. 1).

The conditional operation unit 29 (FIG. 4) comprises a condition code generator 52 having an output connected to the input 38 of the control unit 11 (FIG. 1). A processed information tag masking circuit 53 (FIG. 4) having an output connected to an input 54 of the condition code generator 52 and the external line 31.

The conditional operation unit 29 also includes a processed information status register 55 having four inputs connected to the outputs of the register unit 7 (FIG. 1), the counter 21, the unit 20 and the switch 25, respectively, and a multichannel output (FIG. 4) coupled to a multichannel input 56 of the processed information tag masking circuit 53.

The conditional operation unit 29 further includes a condition code polarity register 57 and a processed information tag mask register 58 having multichannel inputs/outputs connected to the internal bidirectional information buses 9₁, 9₂, and multichannel inputs coupled to the microinstruction bus 15. A multichannel output of the processed information tag mask register 58 is applied to a multichannel input 59 of the processed information tag masking circuit 53. An output of the condition code polarity register 57 is applied to an input 60 of the condition code generator 52.

The control unit 11 (FIG. 5) comprises an operating mode register 61 for the microprocessor apparatus having multichannel inputs/outputs coupled to the internal bidirectional data buses 9₁, 9₂, a microinstruction register 62 whose multichannel input is coupled to the microinstruction bus 15, a microoperation decoder 63 having a multichannel inputs 64 coupled to a multichannel inputs 65 of the operating mode register 61 and to a multichannel output of the microinstruction register 62. A multichannel output of the microoperation decoder 63 is applied to the control inputs 39, 40, 41, 42 of the units 21, 20, 25, 29, respectively (FIG. 1).

The control units 11 includes an internal operating cycle generator 66 (FIG. 5) having inputs connected respectively to the triggering line 17 and to the output of the conditional operation unit 29 (FIG. 1). The internal operating cycle generator 66 (FIG. 5) has and input/output coupled to the clock bus 19 and a multichannel input 67 connected to a multichannel output of the operating mode register 61.

The microprocessor data exchange apparatus of the invention is a single integrated C-MOS technology circuit and is enclosed in a package having 42 outputs.

The external bidirectional data buses 5₁, 5₂ and 6 (FIG. 1) are eight-bit ones, whereas a microinstruction placed on the microinstruction bus 15 is a five bit one. Although a small number of bits is used in the microinstruction, the set of microinstructions includes a large number of different operations. This is achieved by the microprocessor apparatus operating mode register 61 (FIG. 5) which comprises a microinstruction group flip-flop A (Table 1 specifying the microprocessor data exchange apparatus operating modes), a shift operation flip-flop B, a microinstruction repetition flip-flop D, a conditional operation flip-flop C, a flip-flop E for loading the registers 57 and 58 (FIG. 4) with a microinstruction code placed on the microinstruction bus 15. None of the flip-flops A, B, C, D and E is shown in the Figs.

TABLE 1

| Flip-flops of the unit operating mode register 61 1 | Functions of flip-flops 2 | Contents of the flip-flop 3 | Microprocessor data exchange apparatus operating mode 5 |
| --- | --- | --- | --- |
| A | Microinstruction group flip-flop | "0" "1" | The first group of microinstructions The second group of microinstructions |
| B | Shift operation flip-flop | "0" "1" | Operation without information shift Operation with information shift |
| C | Conditional operation Flip-flop | "0" "1" | Execution of the microinstruction depends on a condition code Microinstruction is executed unconditionally |
| D | Microinstruction repetition flip-flop | "0" "1" | Microinstruction is executed once Microinstruction is executed multiply |
| E | Service register load flip-flop | "0" "1" | Microinstruction code corresponds to a single operation Microinstruction code is loaded into the service registers |

Each microinstruction code maps into one of operations determined by the microinstruction set of the microprocessor data exchange apparatus. The microinstruction set specifies information write and read operations for information transferred to or stored in the service registers 57, 58, 61 (FIG. 5), information switching operations to the bidirectional external data buses 5₁, 5₂, 6 (FIG. 1), information transfer operations with masking, comparison and arbitration from one external bidirectional bus to another such as, for example, from the bus 5₁ or 5₂ to the bus 6, and information format conversion operations.

The processed information tag mask register 58 (FIG. 4) is a four-bit register comprising a flip-flop F storing the shift register 45 output mask (FIG. 2), a flip-flop G storing the counter 21 overflow output mask (FIG. 1), a flip-flop H storing a tag mask of information processed in the data processing/converting unit 20 and a flip-flop J storing a tag mask of information passing through the switch 25. None of the flip-flops F, G, H and J is shown in the Figs.

The functions of the flip-flops F, G, H and J and the operation of the processed information tag masking circuit 53 (FIG. 4) depending on codes in the flip-flops F, G, H and J of the tag mask register 58 are summarized in Table 2.

TABLE 2

| Flip-flops of the register 58 | The function of the flip-flops of the processed information tag mask register 58 | The contents of the flip-flop | Operation of processed information tag masking circuit 53 depending on processed information tag mask register 58 codes |
| --- | --- | --- | --- |
| F | Shift register output mask flip-flop | "0" | Information from the output of the shift register has been masked |
| | | "1" | Information from the output of the shift register has been unmasked |
| G | Counter overflow output mask flip-flop | "0" | Information from the overflow output of the counter has |

TABLE 2-continued

| Flip-flops of the register 58 | The function of the flip-flops of the processed information tag mask register 58 | The contents of the flip-flop | Operation of processed information tag masking circuit 53 depending on processed information tag mask register 58 codes |
|---|---|---|---|
| | | "1" | been masked Information from the overflow output of the counter has been unmasked |
| H | Flip-flop storing a tag mask of information processed in the information processing unit 20 | "0" | Tag-signal of information being processed in information processing unit 20 has been masked |
| | | "1" | Tag-signal of information being processed in information processing unit 20 has been unmasked |
| J | Flip-flop storing a tag mask of information passing through the switch 25 | "0" | Tag-signal of information passing through the switch 25 has been masked |
| | | "1" | Tag-signal of information passing through the switch 25 has been unmasked |

Operation of the microprocessor data exchange apparatus is initiated by a microinstruction applied to the multichannel input 14 (FIG. 1) of the control unit 11 on the microinstruction bus 15 transmitting a code corresponding to an information load operation into the microprocessor apparatus operating mode register 61 (FIG. 5), the processed information tag mask register 58 (FIG. 4) and the condition code polarity register 57 from one of the external bidirectional data buses 5₁, 5₂ and 6 (FIG. 1). A microinstruction is accompanied by a triggering signal applied via the triggering line 17 to the input 16 of the control unit 11. The microinstruction is stored in the microinstruction register 62 and decoded by the microinstruction decoder 63 of the central unit 11 (FIG. 5).

Figure 4:
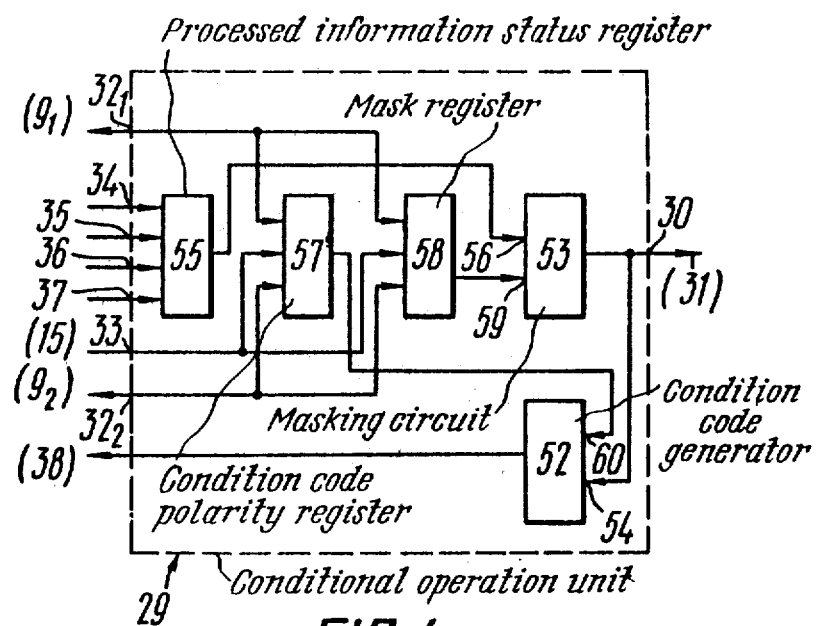
FIG. 4 is a block diagram of an embodiment of the conditional operation unit, of the invention.
Figure 5:
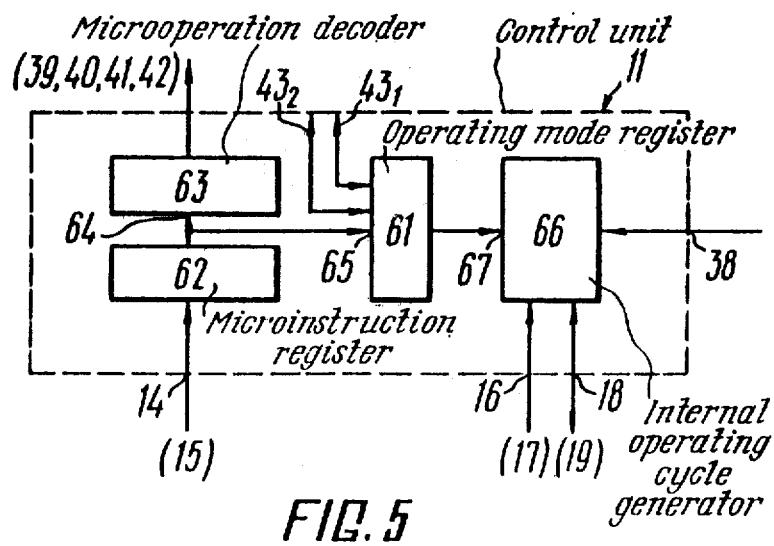
FIG. 5 is a block diagram of an embodiment of the control unit, of the invention.

Under the action of control signals generated by the microoperation decoder 63, the information on the external bidirectional data buses 5₁, 5₂, 6 is transferred via appropriate data exchange units 1₁, 1₂, 2 to the internal bidirectional data buses 9₁, 9₂ and is loaded into the service registers 61 (FIG. 5), 57 and 58 (FIG. 4). If a microinstruction code corresponds to an operation of loading service registers 61 (FIG. 5), 57 and 58 (FIG. 4), the flip-flop E (Table 1) for loading the service registers, which is incorporated in the microprocessor apparatus operating mode register 61 (FIG. 5), is set.

The next microinstruction which is also associated with a triggering signal on the triggering line 17 (FIG. 1), depending on the contents of one of its bits, is loaded either into the microprocessor apparatus operating mode register 61 (FIG. 5) or the service registers 58 and 57 (FIG. 4). The information loaded into these registers determines the microprocessor data exchange unit operating mode.

After a given microinstruction has been executed, a signal indicating the associated condition appears at the input/output 18 of the control unit 11 (FIG. 1). Thereby, as long as this signal occurs, even though the next triggering signal is applied to the triggering line 17, a new microinstruction appearing on the microinstruction bus 15 will not be stored in the microinstruction register 62 (FIG. 5).

Assume, for example, that it is necessary to transfer an information array of K words from one external bidirectional data bus 5₁ (FIG. 1) to the other external bidirectional data bus 5₂. The operation is implemented by executing a microprogram consisting of three microinstructions.

When the first microinstruction appears, information concerning a dimension of the K-word array is loaded into the counter 21. Information concerning a dimension of the K-word array arrives from the external bidirectional data bus 6 the data exchange unit 2 and via the switch 25 to the internal bidirectional data bus 9₁ by means of which it is transferred to the inputs/outputs 22₁ of the counter 21 and stored in it. Information concerning the K-word array dimension is submitted in the one's complement code. This means that if K is added to this code, all bits of the counter 21 will be "ones".

With the second microinstruction being transferred, the microprocessor apparatus operating mode register 61 (FIG. 5) is loaded with code "00010" (Table 1) corresponding to the first microinstruction group and to the repeatable microinstruction, loading the condition code polarity register 57 (FIG. 4) with the code corresponding to the positive polarity of a condition and loading the processed information tag mask register 58 with code "0100" (Table 2) associated with the unmasked signal from the overflow output of the counter 21 (FIG. 1).

When the third microinstruction occurs, information is transferred from the external bidirectional data bus 5₁ to the external bidirectional data bus 5₂ while counting occurs simultaneously in the counter 21.

Under these conditions, the counter 21 generates an overflow signal which is applied to the conditional operation unit 29. Since the processed information tag mask register 58 (FIG. 4) contains a code corresponding to unmasking the overflow signal of the counter 21 (FIG. 1), a signal is applied to the external line 31, which is associated with the overflow signal from the most significant bit of the counter 21 (the overflow on/off signal). Transfer of the information tag to the external line 31 is performed to display the operation.

With the counter 21 non-overflowed, the zero signal (a negative polarity) is applied to the second input of the control unit 11 via the condition code generator 52 (FIG. 4). Since, under these circumstances, the condition code polarity register 57 (FIG. 4) corresponds to a positive polarity of the condition, the signal at the input 38 (FIG. 1) of the control unit 11 represents a situation when the condition does not hold. This causes the third microinstruction to be repeated until the signal at the input 38 represents a situation when the condition holds, that is, until the entire K-word array of information is transferred. After that, a signal indicating the execution of the third microinstruction appears at the input/output 18 of the control unit 11. While executing the third microinstruction, a transition from one microcycle to another is indicated by the internal operating cycle generator 66 (FIG. 5) by generating pulses on the clock bus 19 (FIG. 1). A microcycle is understood as a single-shot execution of a microinstruction.

Execution of the information array transfer operation permits an increase in the speed of the microprocessor data exchange apparatus, since a need to receive the next microinstruction is eliminated. That is, the microprocessor data exchange apparatus tends to execute the microinstruction and operates at its maximum speed.

An example of operation for a data exchange with arbitration is considered under the assumption that information (arbitration requests) arrives on the external bidirectional data bus $5_1$, an information masking request is on the external bidirectional information bus $5_2$ and the operation result is on the bus 6.

The microprogram of the operation for an information exchange with arbitration also consists of three microinstructions.

When executing the first microinstruction, information masking the arbitration request is stored in the storage register 44 (FIG. 2). A code of the appropriate microinstruction is applied along with the triggering signal applied via the triggering line 17. The information from the external bidirectional data bus $5_2$ is transferred via the data exchange unit $1_2$ to the internal bidirectional data bus $9_2$ and is loaded into the storage register 44 (FIG. 2) of the register unit 7 (FIG. 1). With the second microinstruction being subjected, the operating mode register 61 (FIG. 5) is loaded with code "10110" (Table 1) which corresponds to the second group of microinstruction to be executed repeatedly, depending on a condition code, the information tag mask register 58 (FIG. 4) is loaded with code "0010" (Table 2) associated with an unmasked tag signal of the information processed by the unit 20 (FIG. 1), and the condition code polarity register 57 (FIG. 4) is loaded with the code corresponding to the negative polarity of the condition code.

Then, the third microinstruction, whose code is associated with the operation for information exchange with arbitration, is submitted. At the same time, the data exchange unit $1_1$ receives information and transfers it via the internal bidirectional data bus $9_1$ to the multichannel input group $23_1$ of the data processing/converting unit 20. Simultaneously, information loaded earlier into the storage register 44 (FIG. 2) is transferred via the multichannel inputs/outputs $46_2$ of the internal bidirectional data bus $9_2$ (FIG. 1) to the multichannel input group $23_2$ of the data processing/converting unit 20. The information is fed to the masking circuit 48 (FIG. 3) of the data processing/converting unit 20 and from its output, to the multichannel inputs 51 of the priority circuit 49.

The priority circuit 49 selects the highest priority unmasked "one" signal (arbitration). Information is applied to the external bidirectional data bus 6 from the data processing/converting unit 20 (FIG. 1) output via the switch 25 and the data exchange unit 2. At the same time, the information processed (a signal of the comparison with "0") is applied to the conditional operation unit 29. Since the processed information tag mask register 58 (FIG. 4) contains code "0010" (Table 2) corresponding to the unmasked tag signal of information processed in the data processing/converting unit 20, a signal is raised on the external line 31 (FIG. 1), which represents a situation of unmasked requests being absent (present). With unmasked requests being absent and due to the condition code polarity register contents corresponding to the negative polarity of the condition, a signal at the second input 38 (FIG. 1) of the control unit 11 represents a situation when the condition does not hold. This causes information transfer on the external bidirectional information bus via the data or information exchange unit 2 to be inhibited and the operation is repeated unless a signal at the second input 38 of the control unit 11 corresponds to the condition being fulfilled. This causes information to be applied to the external bidirectional information bus 6 and the control unit 11 generates at the clock bus 19 a signal indicating that the microinstruction have been completed. During microinstruction execution the transition from one microcycle to another is performed by pulses arriving from the control unit 11 on the clock bus 19.

The inclusion of the priority circuit 49 (FIG. 3) in the data processing/converting unit 20 permits the broadening of the range of applications of the microprocessor data exchange unit, so that it may be used in constructing main bus arbiters, controllers.

An example of converting information formats from a series code to a parallel code (information in the series code is transferred on the least significant bit of the external bidirectional data bus $5_1$) is now considered. When the first microinstruction is applied to the microinstruction bus 15, the operating mode register 61 (FIG. 5) is loaded with code "01010" (Table 1), the condition code polarity register 57 (FIG. 4) stores the code corresponding to the positive polarity of the condition and the processed information tag mask register 58 is loaded with code "1000" (Table 2).

When the second microinstruction, whose code is associated with the shift operation, appears, the information is loaded to the least significant bit of the shift register 45 (FIG. 2). The operation is repeated until the shift register 45 is filled with the information, thereafter causing an end-of-microinstruction signal to appear on the clock bus 19 (FIG. 1). While a microinstruction is being executed, transition from one microcycle to another is effected by pulses applied from the control unit 11 to the clock bus 19.

The microprocessor information exchange unit can execute both two-cycle, two clock pulses per microcycle, unrepeated and repeated microinstructions. That is, microinstructions for converting byte-word formats (8 bits-16 bits) and word-byte formats are executed, the microinstruction of associative access (switching on a comparison).

It is possible to expand the word length of data or information being processed while executing exchange operations by combining several microprocessor information exchange units into a group. The units are thereby mutually synchronized by combining the clock buses of the microprocessor information exchange units, and respond to common conditions, by combining external buses 31.

The expansion of the word length capacity by combining a number of microprocessor information exchange units permits the performing of exchange operations with multi-bit operands whose word length is a multiple to 8. No additional hardware is required to combine such units.

The apparatus of the invention can be utilized in controllers of microprocessor systems, arbitrators, main bus switches and interfaces of microprocessors.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Microprocessor apparatus for data exchange, said apparatus having external bidirectional data buses, two groups of data exchange units having first multichannel inputs/outputs coupled to said external bidirectional data buses, control inputs and second multichannel inputs/outputs, internal bidirectional data buses, a register unit having bidirectional inputs/outputs coupled to said internal bidirectional data buses, a control input, and an output, said internal bidirectional data buses connecting the second multichannel inputs/outputs of the data exchange units of a first of said two groups, a microinstruction bus, a triggering line, a clock bus, and a control unit having a multichannel output connected to the control inputs of the data exchange units of said two groups and the control input of said register unit, a multichannel input coupled to said microinstruction bus, a first input coupled to said triggering line, an input/output connected to said clock bus, a second input and multichannel inputs/outputs coupled to said internal bidirectional data buses, said apparatus comprising a data processing/converting unit for converting any change in information transmitted in said apparatus, said data processing/converting unit having a control input, a multichannel input, a multichannel input group and a multichannel output and an output;

a counter having inputs/outputs coupled, together with the multichannel input group of said data processing/converting unit, to said internal bidirectional data buses, respectively, a multichannel output coupled to the multichannel input of said data processing/converting unit, a control input, and an output;

a switch for changing the direction of data flow, said switch having a first group of multichannel inputs/outputs coupled to said bidirectional data buses, a second group of multichannel inputs/outputs coupled to the second multichannel inputs/outputs of the data exchange units of a second of said two groups, a multichannel input coupled to the multichannel output of said data processing/converting unit, a control input, and an output; and a conditional operation unit for generating processed information tags, said conditional operation unit having an input/output coupled to an external line, multichannel inputs/outputs coupled to said bidirectional data buses, a control input, a multichannel input connected to said microinstruction bus, inputs connected respectively to the output of said register unit, the output of said counter, the output of said data processing/converting unit and the output of said switch, and an output coupled to the second input of said control unit, the multichannel output of said control unit being connected to the control inputs of said counter, said data processing/converting unit, said switch and said conditional operation unit, respectively.

2. Apparatus as claimed in claim 1, wherein said register unit comprises a storage register and a shaft register having multichannel inputs/outputs coupled to said internal bidirectional data buses, said shift register having an output of the most significant bit and said output of said shift register being connected to the input of said conditional operation unit.

3. Apparatus as claimed in claim 2, wherein said data processing/converting unit comprises a comparator having a multichannel unit, an output and a multichannel output, a masking circuit having multichannel inputs, an output and a multichannel output, and a priority circuit having a multichannel input and a multichannel output, the multichannel outputs of said comparator, said masking circuit and said priority circuit being combined and connected to the multichannel input of said switch, the multichannel inputs of said comparator and said masking circuit being connected to said internal bidirectional data buses, the multichannel outputs of said comparator and said masking circuit being combined and connected to the multichannel input of said priority circuit, the multichannel input of said comparator being connected to the multichannel output of said counter, and the outputs of said masking circuit and said comparator being combined and coupled to an input of said conditional operation unit.

4. Apparatus as claimed in claim 3, wherein said conditional operation unit comprises a condition code generator having an output connected to the second input of said control unit, a first input and a second input, a processed information tag masking circuit having an output connected to the first input of said condition code generator and coupled to the external line, and multichannel inputs, a processed information status register having four inputs connected to the outputs of said register unit, said counter, said data processing/converting unit and said switch, respectively, and a multichannel output coupled to a multichannel input of said processed information tag masking circuit, a condition code polarity register having multichannel inputs/outputs connected to said internal bidirectional data buses, a multichannel input coupled to said microinstruction bus, and an output connected to the second input of said condition code generator, and a processed information tag mask register having multichannel inputs/outputs connected to said internal bidirectional data buses, a multichannel input coupled to said microinstruction bus, a multichannel output connected to a multichannel input of said processed information tag masking circuit, and an output.

5. Apparatus as claimed in claim 4, wherein said control unit comprises an operating mode register for said microprocessor apparatus having multichannel inputs/outputs coupled to said internal bidirectional data buses, a multichannel input and a multichannel output, a microinstruction register having a multichannel input connected to said microinstruction bus, and a channel output, a microoperation decoder having a multichannel input coupled to the multichannel input of said operating mode register and to the multichannel output of said microinstruction register, a multichannel output coupled to said control inputs of said counter, said data processing/converting unit, said switch and said conditional operation unit, respectively, an internal operating cycle generator having two inputs connected to said triggering line and to the output of said conditional operation unit, an input/output coupled to said clock bus, and a multichannel input coupled to the multichannel output of said operating mode register.

* * * * *